April 1, 1952 — R. J. O'CONNOR — 2,591,091
RECIPROCABLE WINDSHIELD WIPER BLADE MOUNTING
Filed Oct. 30, 1948
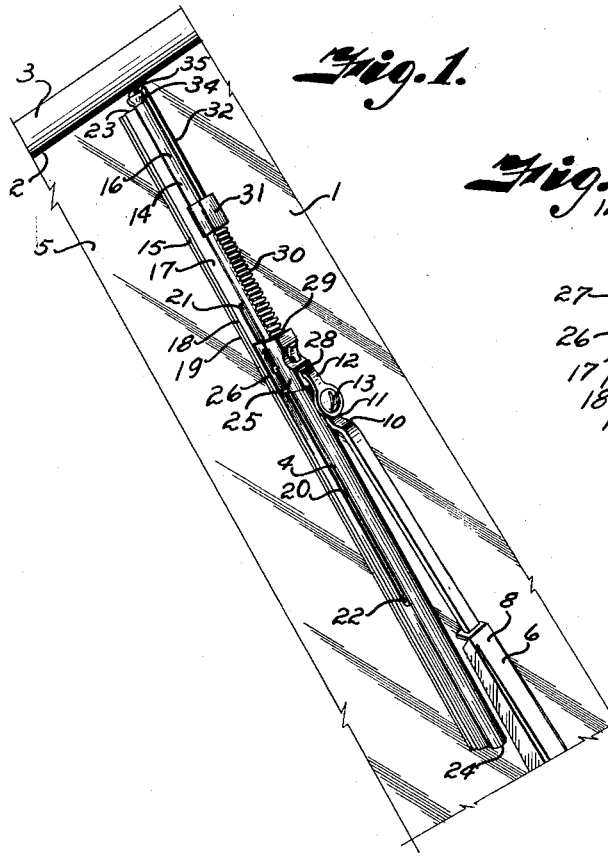
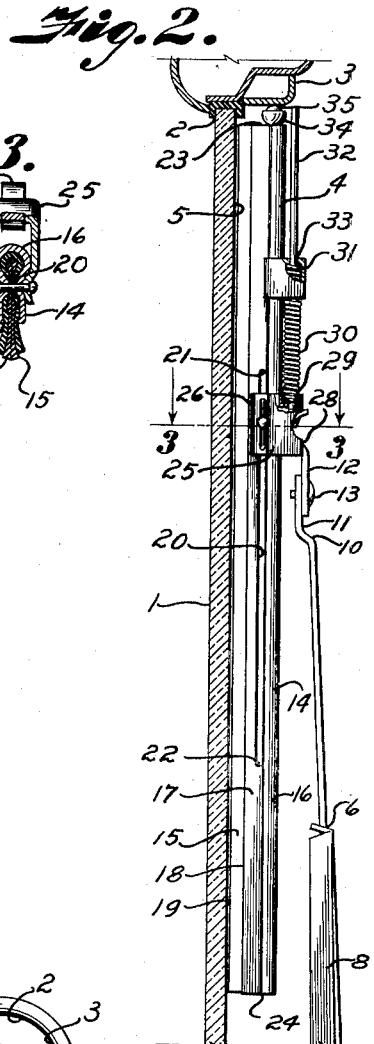
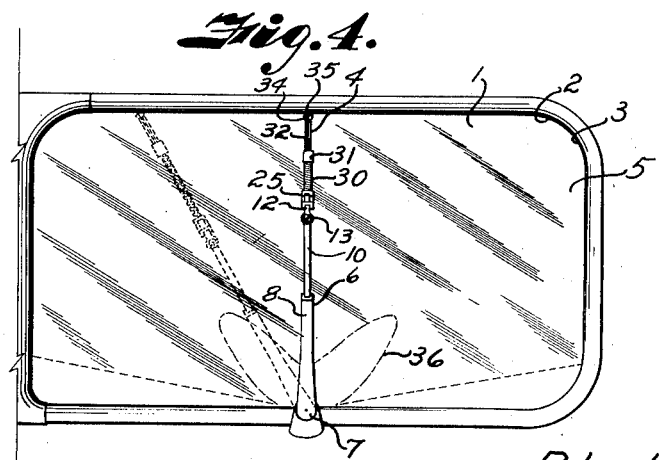
Inventor
Robert J. O'Connor
By Fishburn & Mullendore
Attorneys Patented Apr. 1, 1952

2,591,091

UNITED STATES PATENT OFFICE 2,591,091

RECIPROCABLE WINDSHIELD WIPER BLADE MOUNTING

Robert J. O'Connor, Kansas City, Mo.

Application October 30, 1948, Serial No. 57,536

1 Claim. (Cl. 15—255)

This invention relates to a windshield wiper and more particularly to a wiper having reciprocable mounting on a wiper arm, the principal object being to provide a windshield wiper adapted to clean a relatively larger area of the glass than the ordinary type of wiper which operates through an arc of a circle.

Further objects of the invention are to provide a windshield wiper with reciprocable mounting adapted to be carried by a conventional wiper arm; to provide a resilient member on a wiper tending to move the wiper blade toward the frame of the windshield remote from the axis of oscillation of the arm whereby oscillation of the wiper arm will clean the glass substantially to the frame thereof, increasing the range of vision during inclement weather and operation of said wiper; to provide a bearing member or roller on the outer extremity of the wiper blade for contact with the windshield frame to effect reciprocation of the wiper blade relative to the mounting thereof; and to provide a windshield wiper of this character which is simple in its construction, efficient in operation, automatic in reciprocation, possessing but few working parts, yet is strong, durable and inexpensive to manufacture and install.

In accomplishing these and other objects of the present invention, I have provided improved details of structure the preferred form of which is illustrated in the accompanying drawings, wherein:

Fig. 1 is a perspective view of a wiper blade and mounting constructed in accordance with the invention.

Fig. 2 is a fragmentary vertical sectional view through a windshield showing the wiper in elevation and associated therewith, portions of the wiper being broken away to better illustrate the mounting of the resilient member therein.

Fig. 3 is a transverse sectional view through the wiper on the line 3—3, Fig. 2.

Fig. 4 is an elevation of a wiper on a windshield showing different positions of the wiper, one position being shown in full lines and another by dotted lines, the path of the inner end of the blade being illustrated by dot and dash lines.

Referring more in detail to the drawings:

1 designates a glass or transparent panel forming the windshield of a motor vehicle, said panel being conventionally mounted as at 2 in a frame 3 carried by said vehicle. 4 indicates generally a windshield wiper adapted to wipe and clean the outer face 5 of the transparent panel in response to movement of a wiper arm 6 mounted as at 7 for oscillation in an arc over the face of said panel and connected to a conventional operating mechanism (not shown). The arm illustrated is of conventional structure usually termed a universal arm such as is used on most motor vehicles, and has a shank portion 8. Secured to the shank is a resilient extension 10 terminating in an offset portion 11. A hook portion 12 is secured to the offset portion 11 as by a screw or the like 13.

The wiper blade 4 consists of a channel member 14 preferably formed of metal and adapted to engage over a plurality of rubber or like wiping members 15. The channel blade member is preferably formed to provide a longitudinal substantially cylindrical portion 16 terminating in outwardly extending spaced legs 17 which are clamped onto the rubber wiping members 15. Portions of the legs 17 are crimped as at 18 to aid in holding the wiping members in place, with the free ends 18 of said legs spaced from the wiping edges 19 of the members 15 to provide some flexibility in the rubber wiping members contacting the windshield panel.

The legs 17 and wiping member 15 preferably have slots 20 therein adjacent the crimped portion, said slots terminating as at 21 and 22 in spaced relation to the outer and inner ends 23 and 24 of the wiper blade respectively. Slidably mounted on the cylindrical portion 16 of the wiper blade and particularly the slotted portion thereof is a blade mounting member 25 having side walls 26 shaped for engagement in the crimped portions of the legs 17 to embrace and slidably mount the blade mounting member thereon. To further aid in supporting the mounting member on the blade, a rivet or the like extends through apertures 27 in the side walls 26 and through the slots 20. A portion of the mounting member 25 extends beyond the cylindrical portion 16 of the blade and is provided with slots 28 adapted to be engaged on the hook-shaped member 12 of the wiper arm. This mounting of the blade on the arm permits some hinging movement of the blade. The outer end of the blade mounting member is preferably provided with a recess 29 adapted to seat one end of a coil spring 30, the opposite end of which is seated inside of a spring housing 31, which is fixed to the cylindrical portion of the wiper blade between the end 21 of the slot 20 and the outer end 23 of the blade.

The blade mounting member 25 is preferably provided with a guide member 32 extending through the spring 30 and through an aperture 33 in the spring housing to provide a guide for the spring and blade. The outer end 23 of the blade is provided with a socket 34 suitably fixed to said blade member 15 and provided with an antifriction member such as a ball or roller 35 adapted to engage the frame 3 surrounding the windshield panel. The length of the blade location, length of the slot 20 and length of the arm 6 are such that the roller will engage the frame throughout the arc of oscillation of the arm.

In operating a device constructed as described, the operating mechanism for the wiper is actuated to oscillate the arm 6 in an arc over the windshield. The spring 30 tends to force the spring housing 31 away from the blade mounting member 25. Since the housing 31 is fixed to the blade, the blade is extended outwardly from the blade mounting member until the roller 35 engages the frame 3. Upon oscillation of the arm 6, the blade remains in alignment with said arm and the wiping edges 19 of the rubber wiping members 15 wipe the surface of the panel to clean same. As illustrated in Fig. 4 when the blade is moved, the roller 35 under pressure of the spring 30 remains in contact with the frame 3 and effects sliding movement of the blade relative to the connecting member whereby the windshield is cleaned substantially to the frame throughout the arc of oscillation of the blade, the slot 20 being of sufficient length and location to permit complete movement of the blade to the extremity shown in the dotted lines in Fig. 4, the rivet preventing the wiper from being disengaged from the blade mounting member 25. The dot and dash lines 36 indicate the relative travel of the inner end 24 of the wiper blade and that substantially the entire surface of the windshield is cleaned by the oscillation of the blade.

What I claim and desire to secure by Letters Patent is:

A wiper for a vehicle windshield having a transparent panel in a frame comprising, an actuating arm mounted for oscillation in an arc to sweep over the panel of the windshield, a wiper blade having a longitudinally arranged slot treminating in spaced relation to the ends of the blade, a blade mounting member carried on the free end of the wiper arm in longitudinal alignment therewith and having portions embracing the blade for slidably mounting same for lengthwise reciprocation of the blade longitudinally of the actuating arm, means on the blade mounting member extending into said slot for retaining the member on the blade, guide means fixed on the blade mounting member and extending therefrom parallel to the blade, means on the blade spaced from the blade mounting member having sliding engagement with the guide means for retaining the blade in alignment with the actuating arm, a spring having engagement with the blade and blade mounting means for moving the blade lengthwise away from the actuating arm, and a roller on the end of the wiper blade remote from the axis of oscillation for engaging the windshield frame to limit the longitudinal movement of said blade whereby during oscillation of the actuating arm the blade is in alignment with said arm and the path of movement of the outer end of the blade is defined by the roller and windshield frame.

ROBERT J. O'CONNOR.

REFERENCES CITED

The following references are of record in the file of this patent:

UNITED STATES PATENTS

| Number | Name | Date |
|---|---|---|
| 1,248,795 | Beitman | Dec. 4, 1917 |
| 1,510,509 | Stadeker | Oct. 7, 1924 |
| 1,515,584 | Hansen | Nov. 11, 1924 |
| 2,160,736 | Horton | May 30, 1939 |
| 2,185,572 | Sawyer | Jan. 2, 1940 |
| 2,266,385 | Scinta | Dec. 16, 1941 |
| 2,286,004 | O'Shei | June 9, 1942 |